United States Patent [19]

Geiger et al.

[11] Patent Number: 4,930,103
[45] Date of Patent: May 29, 1990

[54] DATA TRANSMISSION METHOD IN A DIGITAL TRANSMISSION NETWORK AND APPARATUS FOR IMPLIMENTING SAME

[75] Inventors: Gerhard Geiger, Schliersee; Michael Strafner, Munich, both of Fed. Rep. of Germany

[73] Assignee: Siemens Aktiengesellschaft, Berlin and Munich, Fed. Rep. of Germany

[21] Appl. No.: 918,692

[22] Filed: Oct. 16, 1986

Related U.S. Application Data

[63] Continuation of Ser. No. 620,618, Jun. 14, 1984.

[30] Foreign Application Priority Data

Aug. 12, 1983 [DE] Fed. Rep. of Germany ....... 3329228

[51] Int. Cl.$^5$ .................... G06F 11/00; G06F 11/28
[52] U.S. Cl. .................... 364/900; 364/947.2; 364/947; 364/935.4; 364/935.2; 364/935; 364/937; 364/940.81; 364/921.8
[58] Field of Search ... 364/200 MS File, 900 MS File

[56] References Cited

U.S. PATENT DOCUMENTS

| | | | |
|---|---|---|---|
| 4,075,691 | 2/1978 | Davis et al. | 364/200 |
| 4,079,452 | 3/1978 | Larson et al. | 364/200 |
| 4,153,945 | 5/1979 | Actor et al. | 364/900 |
| 4,155,071 | 5/1979 | Shamburger | 371/71 |
| 4,219,881 | 8/1980 | Wilske | 364/900 |
| 4,383,295 | 5/1983 | Miller et al. | 364/200 |
| 4,423,506 | 12/1983 | Kawasaki et al. | 370/85 |
| 4,426,679 | 1/1984 | Yu et al. | 364/200 |

OTHER PUBLICATIONS

"8273, 8273-4, 8273-8 Programmable HDLC/SDLC Protocol Controller", Intel Comp. Data Catalog, Jan. 1981, pp. 8-163 through 8-175.

*Primary Examiner*—Gareth D. Shaw
*Assistant Examiner*—Kevin A. Kriess
*Attorney, Agent, or Firm*—Hill, Van Santen, Steadman & Simpson

[57] ABSTRACT

A method for data transmission in a hierarchically organized data transmission network wherein a central arithmetic unit cyclicly enables local concentrators to transmit data which the concentrators receive from a number of terminals undertakes a check at every concentrator by means of a change detector to determine whether incoming data has changed in comparison to a preeceding inquiry. When a change has occurred, all relative data are immediately transmitted to the arithmetic unit, otherwise, a short acknowledge character is transmitted. A time-redundant inquiry/acknowledge procedure is thus avoided.

17 Claims, 4 Drawing Sheets

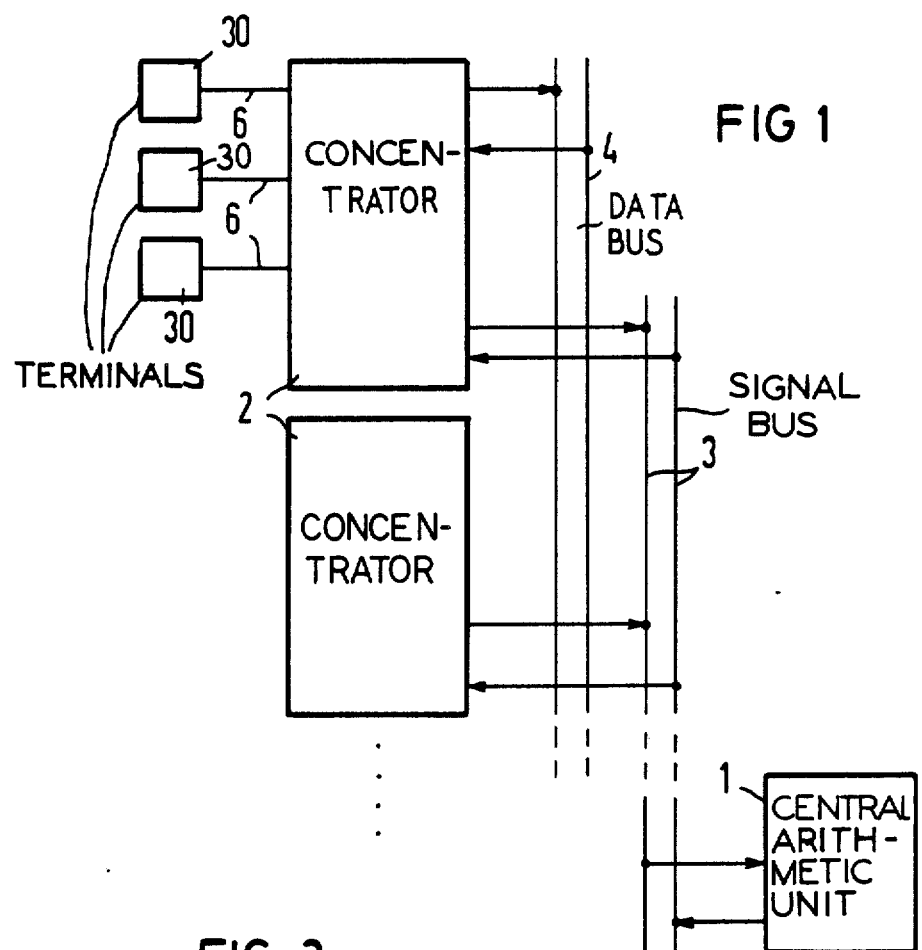
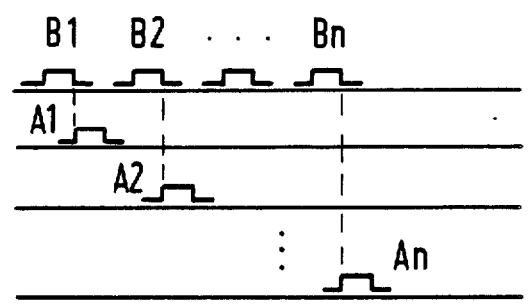

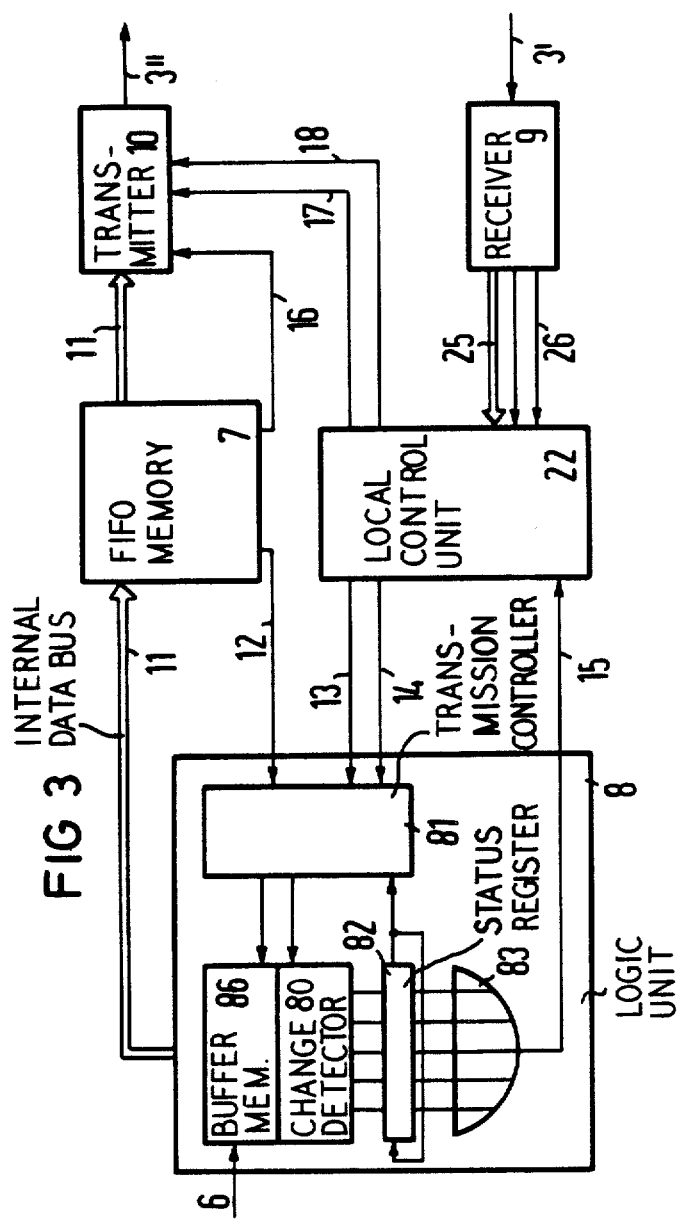

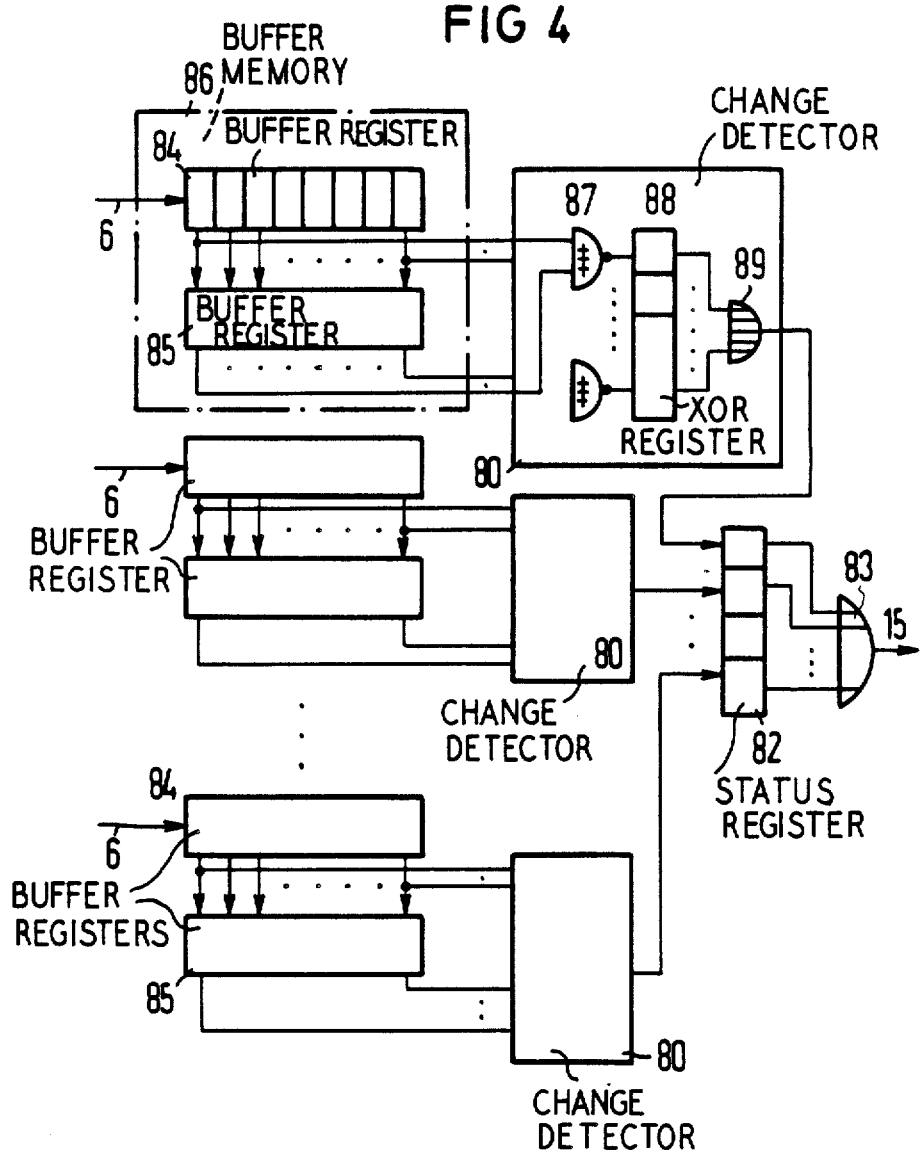

DATA TRANSMISSION METHOD IN A DIGITAL TRANSMISSION NETWORK AND APPARATUS FOR IMPLIMENTING SAME

This is a continuation of application Ser. No. 620,618, filed June 14, 1984.

BACKGROUND OF THE INVENTION

1. Field of the Invention

The present invention relates to a data transmission method and apparatus for use in a digital transmission network, and in particular to such a transmission method and apparatus for use in a hierarchically organized transmission network.

2. Description of the Prior Art

Several methods for bus transmission of digital data in networks organized based on a prescribed hierarchy of the connected network nodes and assemblies are known. Within such so-called master-slave systems, a higher ranking unit (master) supervises the transmission paths and forwards instructions to the lower-ranking units (slaves) which execute these instructions and which react to the instructions with acknowledgement signals.

CCITT Recommendation X.25, which regulates data exchange on communication links, is a transmission rule frequently employed in public networks. In conformity with this rule, data to be transmitted are arranged in serial bit sequence, and together with address bits are packaged into information units in a frame consisting of control and check bits.

A telephone switching system represents an applied example of a digital data transmission network. Such systems generally include a central switching center having an arithmetic unit serving as the master, and a plurality centralized (peripheral) concentrators dependent on the master, with terminals connected thereto. In addition to the actual useful information which is transmitted between the terminals, so-called signaling data must additionally be transmitted between the terminal and switching system such as, for example, busy signals, answering signals, ringing signals, selection signals, and billing information. A further bus on which the signaling data are communicated in packet form is therefore provided in addition to a bus for the useful information between the concentrators and the central arithmetic unit.

Essential auxiliary functions in the execution of data transmission according to the above-described master-slave principle are undertaken by check or control modules with which all lower ranking units are equipped. The functions of such modules are described in the typical transmission procedure described in brief below, commonly utilized in conventional units for the exchange of signaling packets between local concentrators and a central arithmetic unit (processor). The master first successively enables the slaves to transmit data. The check or control module of the respectively addressed slave unit subsequently uses an interupt request to cause the allocated master to evaluate the command. After a prescribed reaction time dependent, for example, on the time necessary to ready the data to be transmitted, the master initiates transmission operation of the slave unit. The data are transmitted to the master. Further details regarding conventional operation of such a controller module are described, for example, in IN-TEL, Comp. Data Catalog, January 1981, pages 8-163 through 8-175.

If the network is used in instances wherein a relatively small amount of data arises, a large portion of the available processing time of the master is unnecessarily dedicated to the execution of these method steps as a result of this transmission protocol because the address controller unit reports every inquiry per interupt request to the processor, and the communication link is consequently inhibited during this time. It has been statistically demonstrated, for example, that given a telephone switching system comprising a plurality of subscriber terminals, only a small portion of the subscribers respectively use or wish to use the communication link simultaneously. Particularly in such cases, known transmission methods therefore have the disadvantage that a relatively time-intensive request/acknowledgement procedure must be cyclicly executed with all subscribers, even though no data are offered for transmission or no transmission is requested. Within a prescribed time cycle, however, the number of lower ranking units with which the central unit can communicate is dependent on the duration of the individual data exchange procedures. Such time redundancy thus reduces the number of possible communication partners within a network.

SUMMARY OF THE INVENTION

It is an object of the present invention to provide a data transmission method and apparatus which shortens the times required for the exchange of signaling signals.

The above object is inventively achieved in a data transmission method in a hierarchically organized digital transmission network having at least one higher ranking unit and a plurality of lower ranking units connected thereto via a bus system, the lower ranking units respectively exchanging data with a plurality of terminals via line connections, the data being forwarded to the higher ranking unit after a request/acknowledgement procedure wherein the incoming data through the data channels are checked in a regular routine as to whether they have changed in comparison to a preceding interrogation time, and if such a change has occurred, a flag allocated to the corresponding line connection is generated. The higher ranking unit successively enables or prompts the lower ranking units to transmit data and if a flag has been generated at a particular terminal, at least the corresponding data received from the terminal are transmitted to the higher ranking unit. If no change has occurred, an acknowledge signal is transmitted to the higher ranking unit.

An apparatus for implementing this method has the line connections associated with each lower ranking unit connected to a logic unit which includes a change detector for the purpose of generating the flags, the outputs of the change detectors being connected to a status register for acceptance of the flag. The method and apparatus disclosed and claimed herein have the advantage that the availability of the central arithmetic unit and the communication links connected thereto are significantly increased. The reaction time required in the above-described transmission protocol which blocks communication links in conventional systems is eliminated, particularly in those instances wherein there is no communication request from a lower ranking unit.

DESCRIPTION OF THE DRAWINGS

FIG. 1 is a schematic block diagram of a bus-oriented hierarchically organized digital data transmission system constructed in accordance with the principles of the present invention.

FIG. 2 is a graphic representation of the chronological sequence of a request/acknowledgement procedure for the transmission system shown in FIG. 1.

FIG. 3 is a schematic block diagram for a lower ranking unit in the transmission system shown in FIG. 1.

FIG. 4 is an exemplary embodiment of a logic unit for use in the lower ranking unit shown in FIG. 3.

Figure 5:
FIGS. 5 and 6 respectively show data arranged in a frame for transmission according to the principles of the present invention.

A transmission network is shown in FIG. 1 having a central arithmetic unit 1, a plurality of concentrators 2, a data bus 4 for transmitting useful data, and a signaling bus 3 for transmission of signaling data. Each concentrator 2 is connected to the central arithmetic unit 1 by means of the signal bus 3. The signal bus 3 consists of two lines for bit-serial data transmission, with a receive line 3' for receiving information and a transmit line 3" for transmitting information (shown in FIG. 3). A plurality of terminals which can receive and transmit analog or digital data are respectively connected to the concentrators 2 by means of line connections 6 in the form of lead pairs. The concentrators 2 switch the data flow to the bus system after coordination by the central arithmetic unit 1.

Figure 7:
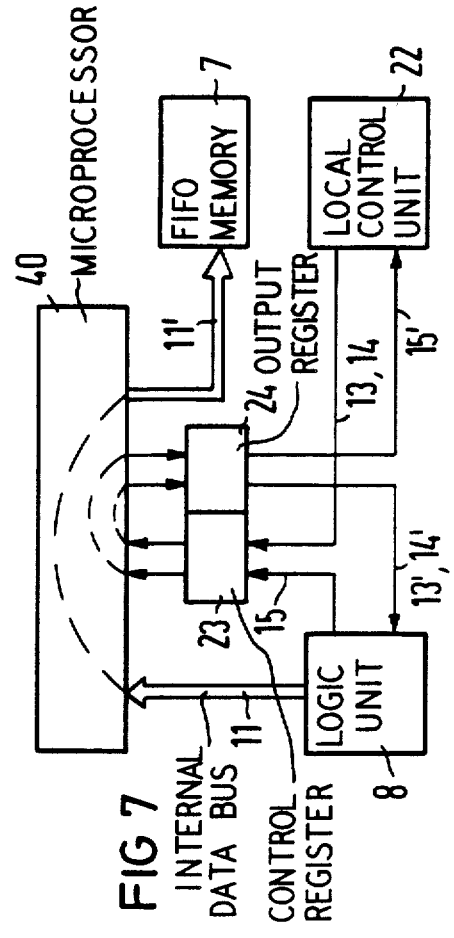
FIG. 7 is a schematic block diagram of an additional portion of a lower ranking unit shown in FIG. 3.

An essential function of the concentrators 2 is to conduct signaling data from the terminals 30 to the central arithmetic unit 1. In order to relieve the central arithmetic unit 1, the concentrators 2 may, as shown in FIG. 7, be respectively equipped with a front end computer 40.

The following figures and the description thereof relate to the transmission of signaling data which occurs, for example, according to a packet-oriented method standardized in accord with X.25 protocol.

Transmission requests B1 through Bn of the central arithmetic unit 1 and acknowledgement signals A1 through An of the concentrators 2, which are dependent thereon, are schematically shown with respect to time in FIG. 2. As the master unit, the central arithmetic unit 1 successively sends instructions to the slave units (concentrators). The first instruction B1 is directed to a first concentrator 2 which immediately reacts with an answer back A1. The second instruction B2 is directed to a second concentrator 2 which responds with an answer back A2, and so on.

A block diagram is shown in FIG. 3 representing one of the concentrators 2. The concentrator 2 includes a logic unit 8 having a buffer memory 86, a change detector 80, a transmission controller 81, a status register 82, and an OR element 83. The concentrator 2 further includes a transmitter 10, a receiver 9, a local control unit 22, and a first in-first out (FIFO) memory 7.

The concentrator two is externally connected to a terminal 30 via lead pairs 6. High Level Data Link Control (HDLC) Reports are received via the receive line 3' of the signaling bus 3, and HDLC Reports are sent to the central arithmetic unit 1 via a transmit line 3".

Operation of the individual terminals 30 differs from terminal to terminal according to point in time, frequency of occurrence of data, and duration of data. In order to ensure short reaction times, however, each request for initiation must be immediately executed or at least immediately acknowledged by a status signal.

As shown in FIG. 4, every terminal 30 has a first buffer register 84 allocated thereto in the logic unit 8 a first buffer register 84 for serial acceptance and intermediate storage of incoming signaling information. All terminals 30 are interrogated and the first buffer registers 84 are inscribed after a prescribed time interval. Previous to such information being written into the buffer registers 84, however, their old contents are deposited into respective second buffer memories 85 in order to permit identification of a possible change in the data by means of bit-by-bit comparison. The second buffer register 85 consists of flip-flops having set inputs (T flip-flops) which respectively assume their input status at the output when an interrogation cycle of the terminals 30 has been concluded.

The input/output comparison is undertaken by change detectors 80. The outputs of the change detectors 80 are conducted to the input side of the status register 82, which is a shift register, such that a specific change detector 80 is allocated to each bit position. Upon the occurrence of a change in the contents of one or more of the buffer registers 83 and 84, the allocated status register location is set to a logical one. A flag is then generated, indicating a change has occurred on a specific data channel line 6.

Each change detector 80 consists of exclusive NOR gates 87 having input sides respectively connected to register locations of the buffer registers 84 and 85, an XOR register 88 having inputs connected to the outputs of the exclusive NOR gates 87, and an OR element 89 having inputs connected to the outputs of the XOR register 88. The buffer registers 84 and 85, the XOR registers 88, and the status register 82 are connected via an internal data bus 11 to the intermediate FIFO memory 7. All relevant data relating to a change is thus guaranteed to be intermediately stored and transmitted.

All outputs of the status register 82 are connected to the OR element 83 at whose output a logical one is present when a signal change has occurred on one of the data channel lines 6. A logical one (flag set) indicates the status "data ready." In a first operating mode A described below, this is cyclicly interrogated and evaluated by the central arithmetic unit 1 in the configuration of FIG. 3. In a second operating mode B, also described below, this status initiates access of a local front end computer 40 which preprocesses the signaling data, as shown and described in FIG. 7.

Operating Mode A

Upon receipt of one of the routine transmit requests from the central arithmetic unit 1 by the receiver 9, the receiver 9 forwards the command to the local unit 22 via parallel lines 25. The instruction is interpreted by the local control unit 22 and a signal "data ready" is noted on line 15. When the "data ready" signal is set, an instruction "begin transmission" is forwarded the transmitter 10 via a line 17. At the same time, an instruction is forwarded via line 13 to the transmission controller 81 to start transmission of the relevant data via the internal data bus 11, the data being intermediately stored in the FIFO memory 7 for output via the transmission line 3". The data to be transmitted consists of the contents of the status register 82, which is stored at the first location in the memory 7 and the signaling bytes of those second buffer registers 85 which are flagged by a logical one in the status register 82, which are stored in the memory 7 at locations following the first location. It is preferable for further processing of the signaling data to also store and simultaneously transmit the contents of the corresponding XOR registers 88. Information identifying from which lead pairs 6 changed data were received, and identifying where the change occurred within the data flow, are thus also transmitted.

The contents of the memory 7 is read by the transmitter 10 and is supplied as an output in an information field in the form of a so-called "I-frame", shown in FIG. 5, to the signal bus 3. The transmission controller 81 is informed whether the memory 7 is completely occupied by line 12. The transmitter 10 receives a report via line 16 when the memory 7 is not occupied. This report thus serves as an "end of transmission" criteria for the transmitter 10. The information supplied as the output of the logic unit 8 may be called as often as desired by the central arithmetic unit 1. Only after arrival of a "receive" acknowledgement from the central arithmetic unit 1, which is forwarded to the local control unit 22 via a line 26, is a "cancel" signal communicated to the transmission controller 81 via the line 14. The result thereof is that the status register 82 and the XOR registers 88 are erased and the first buffer registers 83 are enabled for acceptance of new signaling data from the data channels 6.

Figure 6:

If a "data not ready" (logic level 0) is indicted on line 15, emission of a short acknowledgement character over the transmitter 10 is effected via line 18. This acknowledgement character is included in a so-called "RR-frame" as shown in FIG. 6 having a format known to those skilled in the art in detail as described in the HDLC protocol. In response thereto, the central arithmetic unit 1 causes the next concentrator to transmit.

As shown in FIG. 5, the format of an I-frame comprises a plurality of fields. The first field contains an open byte consisting of a prescribed 0-1 combination. In the present example, the second field contains the originator address. The third field serves for transmitting a frame definition, such as "I" or "RR" which identifies the type of frame, i.e., an "I-frame" or a "RR-frame." In the case of an I-frame, the identifier field is followed by an information field which contains the following data words: a reply protocol field CR, a status register field LLS, and a respective plurality of buffer register fields $LLR_n$ and $XOR_n$ corresponding to the number of subscribers.

The following fields are provided for acceptance of two check bytes, by means of which a positive or a negative redundancy check is possible. The end of the frame is formed by an end byte having a prescribed bit pattern.

The RR-frame shown in FIG. 6 consists only of an open field, an address field, a frame definition field, check fields, and an end field as defined by HDLC protocol.

Operating Mode B

Operating mode B will be described with reference to the portion of the systems schematically shown in FIG. 7. For implementation of operating mode B, each concentrator 2 has a front end computer 40 such as, for example, a microprocessor. The computer 40 is interupt-driven, i.e., whenever a control signal is pending at its interupt input, the running programs are interrupted and a prescribed program is started. The following steps are then executed.

Signaling data arriving from the logic unit 8 via the internal bus 11 are subjected to pre-processing in the front end computer 40 before being written into the FIFO memory 7 via the internal bus 11'. Additionally, all control signals "data ready" or "cancel data" arriving from the local control unit 22 and from the logic unit 8 are supplied to the front end computer 40 through a control register 23. The front end computer 40 controls the local control unit 22 and the logic unit 8 by means of a command output register 24.

Occurrence of a "data ready" signal on line 15 informs the front end computer 40 of an interupt request from the logic unit 8. In response thereto, the front end computer 40 reads the status register 82, the selected second buffer registers 85, and the XOR registers 88. These registers are prevented from changing status until the front end computer initiates a cancellation and release with a receipt acknowledgement via line 14. The front end computer 40 executes pre-processing with the data (for example, digit integration) and enters the data companded in this manner into the FIFO memory 7. The data are intermediately stored therein until retrieved by interrogation on the part of the master unit and are positively acknowledged. Operating mode B (as operating mode A) results in the transmission path not being unnecessarily blocked by a reaction time between inquiry and answer back. The data packet to be retrieved is prepared for transmission while the master unit interrogates other slave units.

Although modifications and changes may be suggested by those skilled in the art it is the intention of the inventors to embody within the patent warranted hereon all changes and modifications as reasonable and properly come within the scope of their contribution to the art.

We claim as our invention:

1. A data transmission method for use in a hierarchically organized digital transmission network having at least one higher ranking unit and a plurality of lower ranking units connected thereto via a data bus system, said lower ranking units respectively exchanging data with a plurality of terminals via line connections, said data being forwarded to said higher ranking unit after a request/acknowledgement procedure, said method comprising the steps of:

(a) checking incoming data on said line connections at said lower ranking units in a regular routine for determining whether said incoming data has changed in comparison to data from an immediately preceding check;

(b) if said checking step shows a change in said incoming data, generating a flag and allocating said flag to the line connection from which changes incoming data is received;

(c) said higher ranking unit successively enabling said lower ranking units for transmitting data to said higher ranking unit;

(d) transmitting at least the changed data identified with said flag from said lower ranking unit to said higher ranking unit; and (e) if no change in incoming data is shown by said check, transmitting an acknowledgement signal from said lower ranking unit to said higher ranking unit.

2. A data transmission method as claimed in claim 1 comprising the additional step following step (d) of intermediately storing data to be transmitted at said lower ranking unit until a receipt acknowledgement signal is transmitted by said higher ranking unit to said lower ranking unit.

3. A data transmission method as claimed in claim 1 wherein step (d) is further defined by the steps of:
generating an information identifier signal identifying from which of said line connections changed data has been received; and
transmitting said information identifier signal to said higher ranking unit in addition to the data received from one or more of said line connections.

4. A data transmission method as claimed in claim 3 comprising the additional step following step (d) of intermediately storing said information identifier at said lower ranking unit together with the data received from the line connection identified by said information identifier.

5. A data transmission method as claimed in claim 1 wherein step (d) is further defined by the steps of:
generating an information change location signal identifying a location in the received flow of data at a line connection at which a change occurs; and
transmitting said change location signal with said data transmitted from said lower ranking unit to said higher ranking unit.

6. A data transmission method as claimed in claim 5 comprising the additional step following step (d) of intermediately storing said change location signal at said lower ranking unit with said changed data from said line connection.

7. A data transmission method as claimed in claim 1 wherein said lower ranking unit has a front end computer and comprising the additional steps following step (c) of:
activating said front end computer when a flag is generated;
pre-processing the data to which said flag is allocated in said front end computer; and
intermediately storing said pre-processed data prior to transmission thereof to said higher ranking unit.

8. A data transmission method as claimed in claim 1 comprising the additional steps following step of:
intermediately storing said changed data prior to transmission thereof to said higher ranking unit; and
checking for the presence of flags with a local control unit at said lower ranking unit upon receipt of a transmission request from said higher ranking unit and, upon finding a flag, said local control unit effecting transmission of the intermediately stored data associated with said flag to said higher ranking unit.

9. In a hierarchically organized digital data transmission network having at least one higher ranking unit and a plurality of lower ranking units connected thereto via a data bus system, said lower ranking units respectively exchanging data with a plurality of terminals via line connections, said data being forwarded to said higher ranking unit after a request/acknowledgement procedure, the improvement comprising:
a logic unit at each lower ranking unit connected to said line connections, said logic unit having a change detector means for each line connection, each change detector means having an output and generating a flag at said output upon the occurrence of a change in incoming data on the line connection associated therewith from immediately preceding incoming data, and a status register having inputs respectively connected to the output of each change detector means, said status register receiving and storing a flag from each change detector means which generates a flag, only incoming data for which a flag has been generated being forwarded to said higher ranking unit upon a data request therefrom.

10. The improvement of claim 9 wherein said status register has a plurality of outputs and further comprising an OR element connected to the outputs of said status register in said logic unit.

11. The improvement of claim 10 further comprising a buffer memory in said logic unit interconnected between each of said line connections and the change detector respectively allocated thereto.

12. The improvement of claim 11 further comprising an intermediate memory in each lower ranking unit having an input to which all of said buffer memories are connected by an internal data bus.

13. The improvement of claim 12 wherein said status register is also connected to said internal data bus.

14. The improvement of claim 12 further comprising an XOR register in each change detector for identifying the location of a change within the flow of data from the line connection associated therewith, said XOR register being connected to said internal data bus.

15. The improvement of claim 12 further comprising an interrupt-driven front end computer in each lower ranking unit which pre-processes said data to be transmitted when a flag is generated, said front end computer having an interrupt control input connected to the output of said OR element, and having data inputs and data outputs connected to said internal data bus.

16. The improvement of claim 15 wherein each of said lower ranking units has a local control unit and further comprising an additional status register interconnected between the outputs of said local control unit and said logic unit and the control inputs of said front end computer.

17. The improvement of claim 15 further comprising a command output register interconnected between the outputs of said front end computer and the inputs of said logic unit and said local control unit.

* * * * *